UNITED STATES PATENT OFFICE 2,688,039

HALOGEN-CONTAINING DI-(SUBSTITUTED PHENYL)-THIOUREAS

Charles F. Huebner, Morristown, and Caesar R. Scholz, Summit, N. J., assignors to Ciba Pharmaceutical Products, Incorporated, Summit, N. J., a corporation of New Jersey No Drawing. Application February 8, 1952, Serial No. 270,736

6 Claims. (Cl. 260—552)

The present invention relates to diphenyl thioureas wherein one phenyl group is substituted in the para-position with a halogen and the other phenyl group is substituted in the para-position with a lower aliphatic radical or an oxygen-lower aliphatic hydocarbon radical.

Despite intensive research for a long time by scientists for chemotherapeutic agents effective against tuberculosis, the results achieved leave much to be desired. A primary object of the present invention is the embodiment of a group of new substances characterized by anti-tuberculosis activity in high degree with a concomitant low toxicity. The substances are adapted to be administered orally.

This object and others which will appear hereinafter is realized by the di - (p - substituted phenyl)-thioureas of the present invention, which thioureas correspond to the formula:

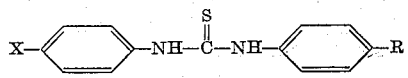

wherein X stands for a fluorine, chlorine, bromine or iodine atom, and R is a radical containing from three to seven carbon atoms and is either a lower aliphatic hydrocarbon radical wherein the carbon atom adjacent to the phenyl ring is a methylene carbon, or is an oxygen-lower aliphatic hydrocarbon radical or one of such radicals wherein the hydrocarbon moiety is substituted in the beta to omega position by hydroxy or lower alkoxy.

The new compounds, as precedingly defined, are obtained by reacting an appropriately p-substituted aniline with an appropriately p-substituted isothiocyanate with or without a solvent such as alcohol, benzene, toluene, propanol and the like. The reaction is carried out as desired either at room temperature or at elevated temperature, although as a general rule, application of external heating is unnecessary. The product crystallizes out of the reaction mixture on cooling. It is immaterial which of the reactants entering the reaction carries the halogen or the hydrocarbon or ether radicals. Thus the products may be prepared from different starting materials by using the correct isothiocyanate and amine as illustrated below:

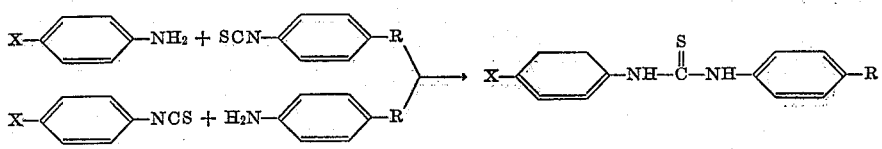

The substituted isothiocyanates are prepared by the method of Dyson [Journal of the Chemical Society, (London) 436 (1927)] by the action of thiophosgene on the desired substituted aniline. It is not essential that the isothiocyanates be isolated and if desired the next step in the process leading to the thiourea may be carried out by adding the desired substituted aniline to the reaction mixture.

The older method of preparing isothiocyanates consisting of reacting the substituted aniline in ammonia with carbon disulfide, preparing the lead salts of the resultant thiocarbamate and decomposing to the isothiocyanate may be used also.

The invention is described in greater detail in the examples below which are presented solely by way of illustration and not by way of limitation. In the examples, parts by weight bear the same relation to parts by volume as do grams to milliliters. Temperatures are expressed in degrees centigrade. Melting points are uncorrected. Percentages are by weight.

EXAMPLE 1

66 parts by weight of p-butoxy aniline in 200 parts by volume of chloroform are added while cooling in an ice bath to a crude suspension of 35 parts by volume of thiophosgene and 400 parts by volume of water. After the mixture warms to room temperature, the chloroform layer is separated, dried, and distilled. Para-butoxyphenyl isothiocyanate distils at 100–117° at 0.2 millimeter pressure. It crystallizes in ice but liquefies at room temperature.

66 parts by weight of p-iodoaniline are dissolved in 1000 parts by volume of alcohol and 62 parts by weight of p-butoxyphenyl isothiocyanate are added. The mixture is refluxed for ½ hour, cooled and filtered. The resultant product, 1 - (p - butoxyphenyl) - 3 - (p - iodophenyl) - 2 - thiourea, after recrystallization from alcohol, melts at 173–176°. It corresponds to the formula

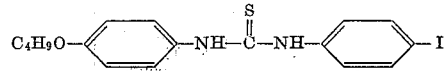

By substituting an equivalent amount of p-fluoroaniline for the p-iodoaniline in the present example, 1 - (p - butoxyphenyl) - 3 - (p - fluorophenyl) - 2 - thiourea, which melts at 155–156° is obtained. From p-fluoroaniline and p-butylphenyl isothiocyanate, there is in similar manner obtained 1 - (p - butylphenyl) - 3 - (p - fluorophenyl) -2-thiourea

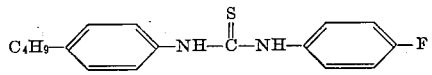

In a similar manner as described above by reacting equimolar quantities of p-iodonaniline with p-isoamoxyphenyl isothiocyanate and p-propylphenyl isothiocyanate respectively, the following thioureas are obtained: 1-(p-iodophenyl)-3-(p-isoamoxyphenyl)-2-thiourea, which melts at 184–185°; 1-(p-iodophenyl)-3-(p-propylphenyl)-2-thiourea, which melts at 176–177°

By analogously reacting p-iodophenyl isothiocyanate with equivalent amounts of; p-propoxy aniline, p-allyloxy aniline, p-butyl aniline or p-isoamyl aniline, the following thioureas are prepared, respectively: 1-(p-iodophenyl)-3- (p-propoxyphenyl)-2-thiourea, melting at 176–178°; 1-(p-allyloxyphenyl)-3-(p-iodophenyl)-2-thiourea, melting at 163–165°; 1-(p-butylphenyl)-3-(p-iodophenyl)-2-thiourea, melting at 169–170°; 1-(p-iodophenyl)-3-(p-isoamylphenyl)-2-thiourea, melting at 178–180°.

EXAMPLE 2

To a solution of 11.5 parts by weight of p-chlorophenyl isothiocyanate in 50 parts by volume of alcohol is added a solution of 10 parts by weight of p-propoxy aniline in 10 parts by volume of ethanol. The product begins to crystallize almost immediately. The mixture is warmed for a few minutes, cooled, filtered, and the separated product washed with a small amount of ethanol and recrystallized from hot ethanol to yield 1-(p-chlorophenyl)-3-(p-propoxyphenyl) - 2 - thiourea, melting at 171–172°.

To a solution of 2 parts by weight of p-chloroaniline in 20 parts by volume of ethanol are added 3.2 parts by weight of p-propoxyphenyl isothiocyanate. The solid which forms after a few minutes is recrystallized from ethanol to give the same end product as described in the preceding paragraph:

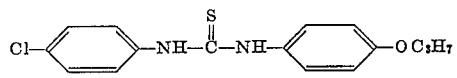

melting at 171–172°.

By reacting p-chlorophenyl isothiocyanate in a similar manner with the p-substituted aniline indicated below the following thiourea compounds have been prepared:

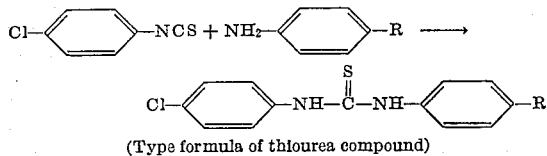

(Type formula of thiourea compound)

| R | Melting Point of Thiourea Compound, Degrees |
|---|---|
| —OC₃H₇(iso) | 171–172 |
| —OC₄H₉(n) | 166–168 |
| —OC₅H₁₁(iso) | 168–170 |
| —OC₆H₁₃(n) | 163–164 |
| —OC₇H₁₅(n) | 157–158 |
| —OC₆H₅ | 165–166 |
| —C₃H₇ | 162–164.5 |
| —C₄H₉(n) | 156–157 |
| —C₄H₉(sec) | 163–164 |
| —C₅H₁₁(iso) | 163.5–164.5 |

The following p-substituted anilines have not been described hitherto. They can be prepared as follows:

A. p-Heptyloxy aniline 100 parts by weight of acetaminophenol and 37 parts by weight of potassium hydroxide are shaken in 400 parts by volume of ethanol until solution occurs. 125 parts by weight of heptyl bromide are added and the mixture refluxed for 12 hours. ¾ of the solvent is then distilled off and water is added to the reaction mixture. The solids are filtered off, washed with water and recrystallized from ethanol. 100 parts by weight of the necessary p-acetaminophenol heptyl ether (melting at 91–92°) are refluxed for 2 hours with a mixture of 43.5 parts by volume of sulfuric acid and 320 parts by volume of water. The reaction mixture is cooled and made alkaline with solid sodium hydroxide. The oily p-heptyloxy aniline is separated by extraction with ether, the ether extract dried over sodium sulfate and the ether removed by distillation. The crude substituted aniline is used in further steps without any additional purification.

EXAMPLE 3

To a solution of 5 parts by weight of p-propoxyphenyl isothiocyanate in 20 parts by volume of ethanol are added 4.5 parts by weight of p-bromoaniline in 50 parts by volume of ethanol. After warming for a few minutes and then cooling, the crystalline product, 1-(p-bromophenyl)-3-(p-propoxyphenyl)-2-thiourea

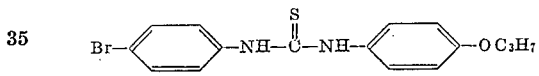

is recrystallized from methanol; it melts at 178–179°.

In a similar manner by reacting equimolar quantities of p-bromoaniline and one of the following isothiocyanates:

p-Butoxyphenyl isothiocyanate;
p-Isoamoxyphenyl isothiocyanate;
p-Butylphenyl isothiocyanate;
p-Isoamylphenyl isothiocyanate;

the following thioureas are obtained, respectively:

1 - (p-bromophenyl)-3-(p-butoxyphenyl) - 2 - thiourea, melting at 170–171°.
1-(p-bromophenyl)- 3 -(p-isoamoxyphenyl) - 2 - thiourea, melting at 177–179°.
1-(p-bromophenyl)-3-(p-butylphenyl) - 2 - thiourea, melting at 173–174°.
1 - (p-bromophenyl)-3-(p-isoamylphenyl) - 2 - thiourea, melting at 180–181°.

The new compounds have been found to be useful, for example, in the treatment of mice infected with a human strain of tubercle bacillus, such for example as Myco-bacterium tuberculosis, strain H 37 RV. In the treatment of thus-infected mice, where the degree of infection is such that 50% of the animals are dead by the twentieth day after infection, the mice are fed the new compound according to this invention incorporated in the diet for 30 days followed by the diet without the said compound. A compound is considered to show good anti-tuberculosis activity if 50% or more of the animals are alive on the 35th day after infection. Those compounds showing good activity may be utilized according to the same method except that they are fed only for 21 days after infection at dose levels ranging from 0.1% down to 0.005% concentration in the diet. Some of the compounds of the invention may be fed at concentrations of 3% without causing noticeable ill effects.

When streptomycin is tested according to this method at a dose level of ½ mg. per 20-gram mouse administered subcutaneously daily for 21 days, 50% or more of the mice will survive 35 days after infection. When mice are fed para-aminosalicylic acid under the conditions described above, 50% or more will survive 35 days at a dose level of 0.5% concentration in the diet. At a concentration of 0.25% the survival results are variable.

Representative results are summarized in the following table:

COMPOUND

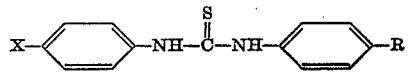

| X | R | Concentration of drug in feed, Percent by weight | Percent animals surviving on 35th day |
|---|---|---|---|
| F— | —$OC_2H_5$ | 0.5 | 70 |
| F— | —$OC_4H_9$ | 0.3 | 90 |
| Cl— | —$OC_4H_9$ | 0.5 | 100 |
| Cl— | —$OC_7H_{15}$ | 0.5 | 100 |
| I— | —$OC_4H_9$ | 0.5 | 90 |

Having thus disclosed the invention what is claimed is:

1. A di-(p-substituted phenyl)-thiourea of the formula

X—⌬—NH—C(=S)—NH—⌬—R wherein X is a member of the group consisting of fluorine, chlorine, bromine, and iodine, and R is a member selected from the group consisting of allyloxy, and alkoxy and alkyl radicals containing from 3 to 7 carbon atoms, the alkyl group being attached to the phenyl ring by a $CH_2$ group.

2. 1 - (p - chlorophenyl) -3-(p-n-propoxyphenyl) -2-thiourea.

3. 1-(p-chlorophenyl)-3-(p-butoxyphenyl)-2-thiourea.

4. 1-(p-chlorophenyl) - 3 - (p-allyloxyphenyl)-2-thiourea.

5. 1 - (p - chlorophenyl)-3-(p-butylphenyl)-2-thiourea.

6. 1 - (p - iodophenyl)-3-(p-butoxyphenyl)-2-thiourea.

References Cited in the file of this patent
UNITED STATES PATENTS

| Number | Name | Date |
|---|---|---|
| 2,061,243 | Lubs et al. | Nov. 17, 1936 |

FOREIGN PATENTS

| Number | Country | Date |
|---|---|---|
| 143,641 | Austria | Nov. 25, 1935 |

OTHER REFERENCES

Hunter et al., "J. Chem. Soc." (London), 1930, pp. 2208-9.

Hickinbottom et al., "J. Chem. Soc." (London), 1930, pp. 1563, 1569.

Dyson et al., "J. Chem. Soc." (London), vol. 125 (1924), pp. 1702-8.

Campbell et al., "Proc. Indiana Acad. Sci.," vol. 53 (1943), pp. 119-21.